United States Patent
Young

(10) Patent No.: US 9,418,388 B1
(45) Date of Patent: Aug. 16, 2016

(54) TECHNIQUES FOR DISPLAYING THIRD PARTY CONTENT

(75) Inventor: Paul K. Young, Sherman Oaks, CA (US)

(73) Assignee: IMDb.com, Inc., Seattle, WA (US)

( * ) Notice: Subject to any disclaimer, the term of this patent is extended or adjusted under 35 U.S.C. 154(b) by 738 days.

(21) Appl. No.: 12/877,810

(22) Filed: Sep. 8, 2010

(51) Int. Cl.
| | |
|---|---|
| G06F 17/00 | (2006.01) |
| G06Q 50/00 | (2012.01) |
| G06F 17/30 | (2006.01) |
| G06F 17/22 | (2006.01) |
| H04L 29/08 | (2006.01) |
| H04N 21/235 | (2011.01) |
| H04N 21/25 | (2011.01) |
| H04N 21/435 | (2011.01) |

(52) U.S. Cl.
CPC ............ *G06Q 50/01* (2013.01); *G06F 17/2247* (2013.01); *G06F 17/3089* (2013.01); *G06F 17/30867* (2013.01); *G06F 17/30873* (2013.01); *H04L 67/02* (2013.01); *H04L 67/10* (2013.01); *H04L 67/306* (2013.01); *H04N 21/2358* (2013.01); *H04N 21/25* (2013.01); *H04N 21/4358* (2013.01); *G06F 2209/545* (2013.01); *G06F 2216/15* (2013.01); *G06F 2221/2119* (2013.01)

(58) Field of Classification Search
CPC .............. G06Q 50/01; G06F 17/30867; G06F 17/30873; G06F 2216/15; G06F 17/2247; G06F 17/3089; G06F 2209/545; G06F 2221/2119; H04L 67/02; H04L 67/10; H04L 67/306; H04N 21/2358; H04N 21/25; H04N 21/04; H04N 21/4358
USPC .................................................. 715/207, 234
See application file for complete search history.

(56) References Cited

U.S. PATENT DOCUMENTS

| | | | | |
|---|---|---|---|---|
| 7,720,853 | B1* | 5/2010 | Siegel et al. ................... | 707/754 |
| 2002/0156803 | A1* | 10/2002 | Maslov et al. ................ | 707/500 |
| 2003/0229900 | A1* | 12/2003 | Reisman .......................... | 725/87 |
| 2004/0031058 | A1* | 2/2004 | Reisman ....................... | 725/112 |
| 2006/0159109 | A1* | 7/2006 | Lamkin et al. ................ | 370/401 |
| 2007/0208751 | A1* | 9/2007 | Cowan et al. ................... | 707/10 |
| 2008/0005125 | A1* | 1/2008 | Gaedeke ......................... | 707/10 |
| 2008/0313648 | A1* | 12/2008 | Wang et al. .................... | 719/315 |
| 2009/0327858 | A1* | 12/2009 | Tsun et al. ..................... | 715/234 |
| 2010/0058293 | A1* | 3/2010 | Dunagan et al. .............. | 717/116 |
| 2010/0169363 | A1* | 7/2010 | Gaedcke ........................ | 707/769 |
| 2010/0269030 | A1* | 10/2010 | Dugonjic et al. ............. | 715/207 |
| 2010/0281357 | A1* | 11/2010 | Fu et al. ......................... | 715/234 |
| 2010/0299588 | A1* | 11/2010 | Dattilo et al. .................. | 715/234 |
| 2011/0055314 | A1* | 3/2011 | Rosenstein et al. ........... | 709/203 |
| 2011/0055683 | A1* | 3/2011 | Jiang ............................. | 715/234 |
| 2011/0173071 | A1* | 7/2011 | Meyer et al. ................ | 705/14.54 |
| 2011/0282821 | A1* | 11/2011 | Levy et al. ....................... | 706/47 |

* cited by examiner

Primary Examiner — Nathan Hillery
(74) Attorney, Agent, or Firm — Hogan Lovells US LLP

(57) ABSTRACT

Systems and methods for managing third party content are described. In one embodiment, the method includes storing information for a plurality of third party content elements that were selected by a user for display with a page of content, in response to a user request corresponding to a page associated with one of the plurality of third party content elements specified by the stored information, rendering for display on the page a third party content module associated with the third party content element, and, in response to a user modification of the third party content module, storing information corresponding to the user modification. The modified content module is rendered for display on a page of content according to the stored information. The user has the ability to customize and control the parameters of content modules selected by the user to be rendered on the accessed page.

20 Claims, 8 Drawing Sheets

TECHNIQUES FOR DISPLAYING THIRD PARTY CONTENT

BACKGROUND

As an ever-increasing amount of information is available electronically, techniques for displaying this information in ways that are useful and intuitive to a user are becoming more complex. Currently, instances of electronic content such as Web pages available to a user are largely limited to single-site and single-source content. Normally, users have to navigate away from the currently visited Web page in order to access content provided by other sites, such as a user's favorite Web site. The ways of mixing content from popular or favorite sites on the same page have not been available to users as an exciting or useful way to experience the Web. When third party content (e.g., advertisements, buttons, pictures, logos, and the like) is displayed on a Web page visited by a user, the user normally may have control over the configuration, size, and/or type of the third party content displayed on the currently visited Web page. The user likewise will not have control over how many third party-provided content elements are displayed on the viewed Web page or which third parties are allowed to present their content. Accordingly, the third party content may occupy a substantial amount of "real estate" of a visited Web page, which may not be desirable.

DETAILED DESCRIPTION

Figure 1:
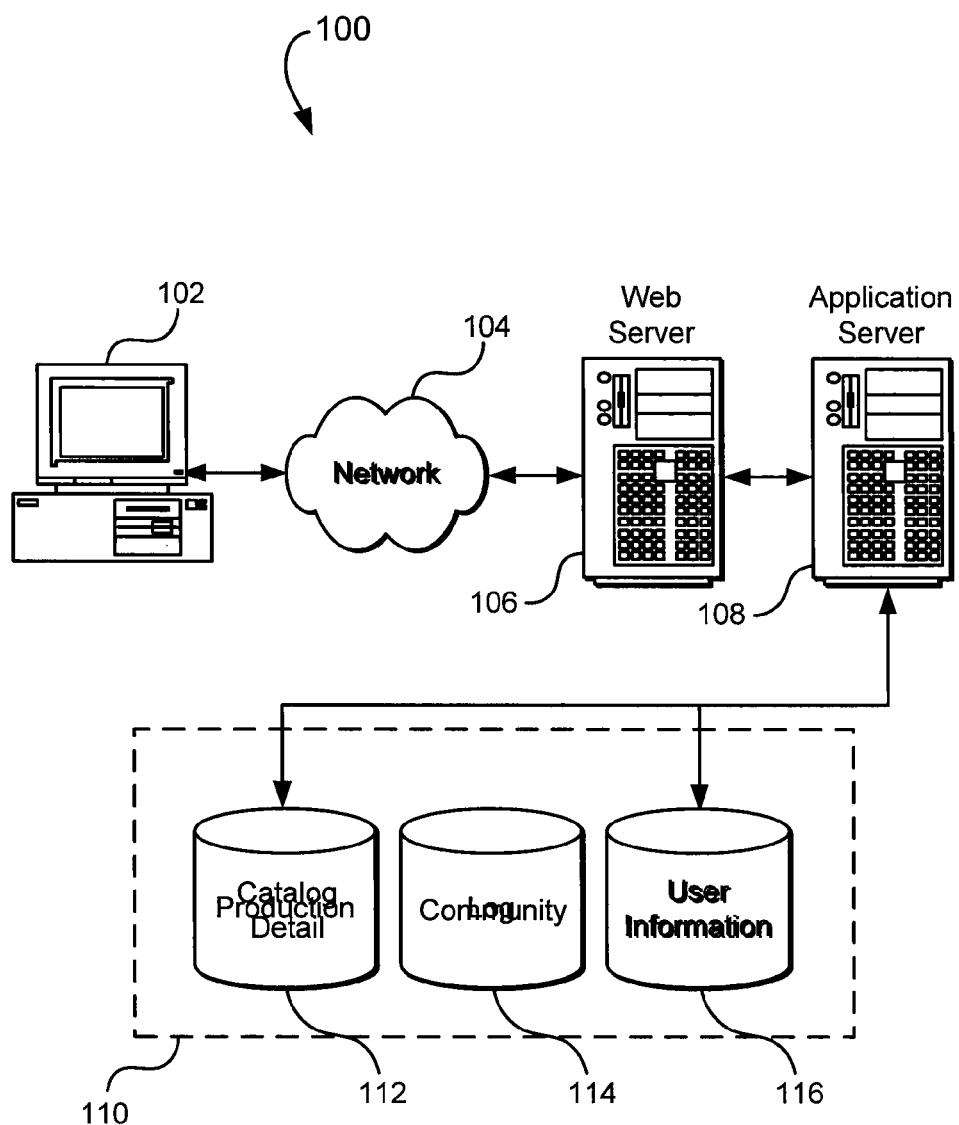
FIG. 1 illustrates an environment in which various embodiments can be implemented.

Systems and methods are presented for integrating multiple types or sources of content, such as third party content, on an otherwise single-site Web page so as to preserve the traditional browsing experience. This can include, for example, displaying third party content modules, widgets, scripts, or other grouping of content that can reside as sidebars, overlays, buttons, frames, modal windows, or other auxiliaries to the primary content similar to a head-up display (HUD) in which the primary site's content occupies the bulk of the viewing field. These third party modules may be user-configurable, e.g., they may be reordered, may occupy different slots on a Web page, may have different formats and/or may be enabled or disabled by the user. Integration techniques disclosed herein preserve the traditional browsing experience for single-site Web pages (source pages) while allowing for third party content modules to execute over the currently viewed page. In general, a "single-site" Web page as used herein refers to a page of content that includes "main" or "body" content that is provided from a single source, typically a provider of the page, but that may include secondary content from other sources, such as advertising from advertisers or other supplemental content from the same or other third party providers.

Third party content modules may be configured to interact with a source page if allowed by one or more policies of the source page. This may involve collecting information about the source page or the user interaction with the page and sending the information to third party servers. The level of interaction and the selection of the third party content modules may be controlled by the source page content provider, a user of the source page, or any other appropriate entity. The source page content provider may control (e.g., allow, disallow, or limit) the integration, and/or define the parameters of the third party modules that can appear on the source page. A user may have control over enablement or disablement of the third party content modules that were allowed to integrate with the source page. In the latter case, the module may not have any interactions with the source page. A layout, size, location on the page, and functionality of a third party content module may also be controlled by a user depending on his/her preferences. In one embodiment, a user may access a content module by clicking on a third party content module element displayed on the Web page.

Various techniques are disclosed herein which may be used to implement the third party content integration with a source Web site or other such electronic grouping or display of content. For example, third party content providers may develop software applications, such as JavaScript libraries for their content modules which may be embedded by the source site in its pages. A framework may be developed to provide the user control and layout features of the third party content module components as discussed herein. In one embodiment, this could be accomplished in a JavaScript implementation. In another embodiment, special browser support could be added via a plug-in. In this case, a source site would not have to embed a trusted script, such as JavaScript, from each third party content module. In yet another embodiment, the source Web site providers may develop their own content modules associated with third party content and render the modules to a user. The user is provided with an ability to control and customize an interface of the accessed Web site, by, for example, allowing certain content modules to be displayed, configuring the displayed content modules according to the user's preferences, and using the stored user's preferences for displaying the selected and customized content modules in future browser sessions.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
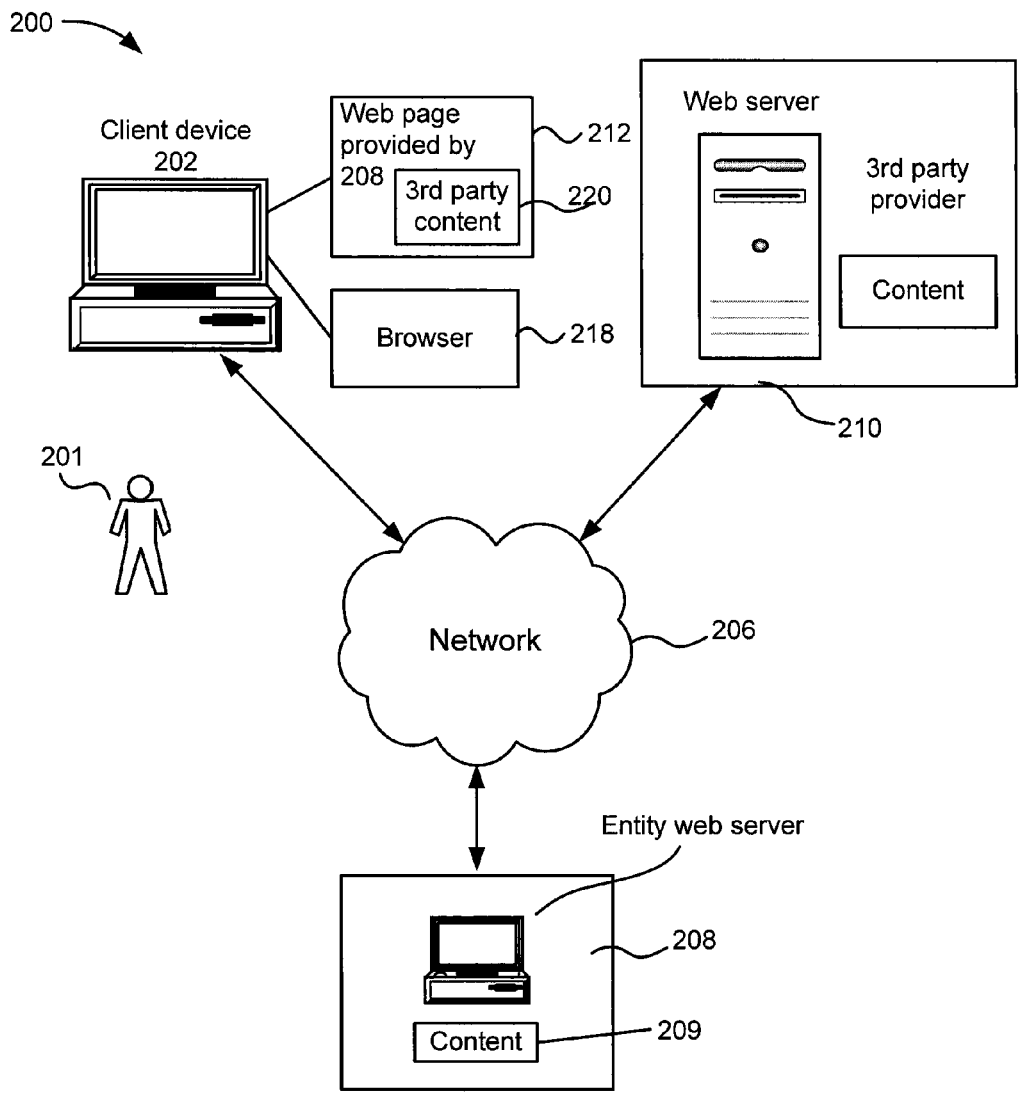
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users 201 that utilize a network, such as the Internet 206, to browse content of various content providers using client computing devices 202. The environment 200 may utilize the Internet as a network; however, it should be understood that other networks may be used as an alternative to or in addition to the Internet. Examples of other networks include mobile networks, intranets, and generally any suitable communications network.

In an embodiment, users 201 may access content provided by content providers in order to consume content, search for information, purchase items offered for consumption or sale, engage in social networking and the like. As shown in FIG. 2, the environment 200 includes an electronic entity 208. The electronic entity 208, for example, may operate a Web site 212 that may be rendered to the client device 202 via a browser 218. The electronic entity 208 may also operate systems, such as those described above in connection with FIG. 1, that enable users to access Web content.

The electronic entity 208 may also operate, affiliate with, or associate with one or more content providers. In an embodiment, the content providers (not shown) may offer content 209 for a Web site 212 operated by the electronic entity 208. As discussed above, the electronic entity may affiliate with content providers and Web sites 212 in a number of different ways. For example, the electronic entity may own content providers 208 and Web sites 212. In an embodiment, the environment 200 may also include one or more affiliate or third party content providers 210. A third party provider 210 may be, for example, an entity that offers content that the electronic entity 208 may allow for placement on a Web site 212 along with the content 209. Third party content providers 210 may cooperate with the electronic entity 208 in various ways. In one embodiment, the content providers 210 may operate their own Web sites and provide content from, or access to, their Web sites through a Web site 212 operated by the electronic entity 208 by placing their own content modules on a Web site 212, as described above. Third party content providers 210 may also utilize various systems, such as those described above in connection with FIG. 1, that enable users to access Web content, and other systems.

In an embodiment, the environment 200 includes components and instructions for generating one or more Web sites 212. One or more of the Web sites 212 may be operated by the electronic entity 208, although they need not be. The Web sites 212 may offer various types of content, such as news, video, shopping or other services, search engine services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites. As noted, in an embodiment, the users 201 may interact with content from the various entities, such as by viewing content from the entities, consuming items from the entities, and the like.

In one embodiment, a third party content provider Web server 210 having a domain external to the electronic entity 208 may serve content modules associated with a Web site 212 to a client device 202 through a network 206. The entity 208 that provides the Web site 212 with content may allow a content module, a feature, or any other type of a Web element representing a third party Web site to be displayed on the Web site 212 and rendered to the client device 202. For example, the entity 208 may render a "button," a side bar, an overlay, or any other feature that, when accessed by a user on the client device 202, may enable one or more features pertaining to the content rendered by the third party Web site, for example, a "chat," a "social bar," and the like. A content module may be rendered in a meta markup language such as HTML, XML, XHTML, or the like.

The third party content provider 210 through its Web server may provide features, links, or elements needed to operate a module rendered by the entity 208 on the Web site 212 as will be discussed below in greater detail. As described above, a content module may include, but is not limited to, a sidebar, an overlay, a button, a widget or other auxiliary to the primary content of the Web site 212. A content module may be implemented, for example, in an iFrame sourcing to a third party Web site and used to load the module from the third party Web site. In another embodiment, the entity 208 may render a third party content module using its own Web server while requesting content for the module from the third party Web server. In yet another embodiment, the entity 208 may import the third party's library (e.g., JavaScript library) and execute the script on the Web site 212. In yet another embodiment, the script may be run on the Web site as a local copy of the script maintained by the third party content provider. The user 201 of the client device 202 may have control over the configuration, location, and functionalities of the content module depending on the user's preferences. The details of the integration of a third party content module with a Web site operated by the entity 208 will be discussed below in reference to FIGS. 3-5.

Figure 3:
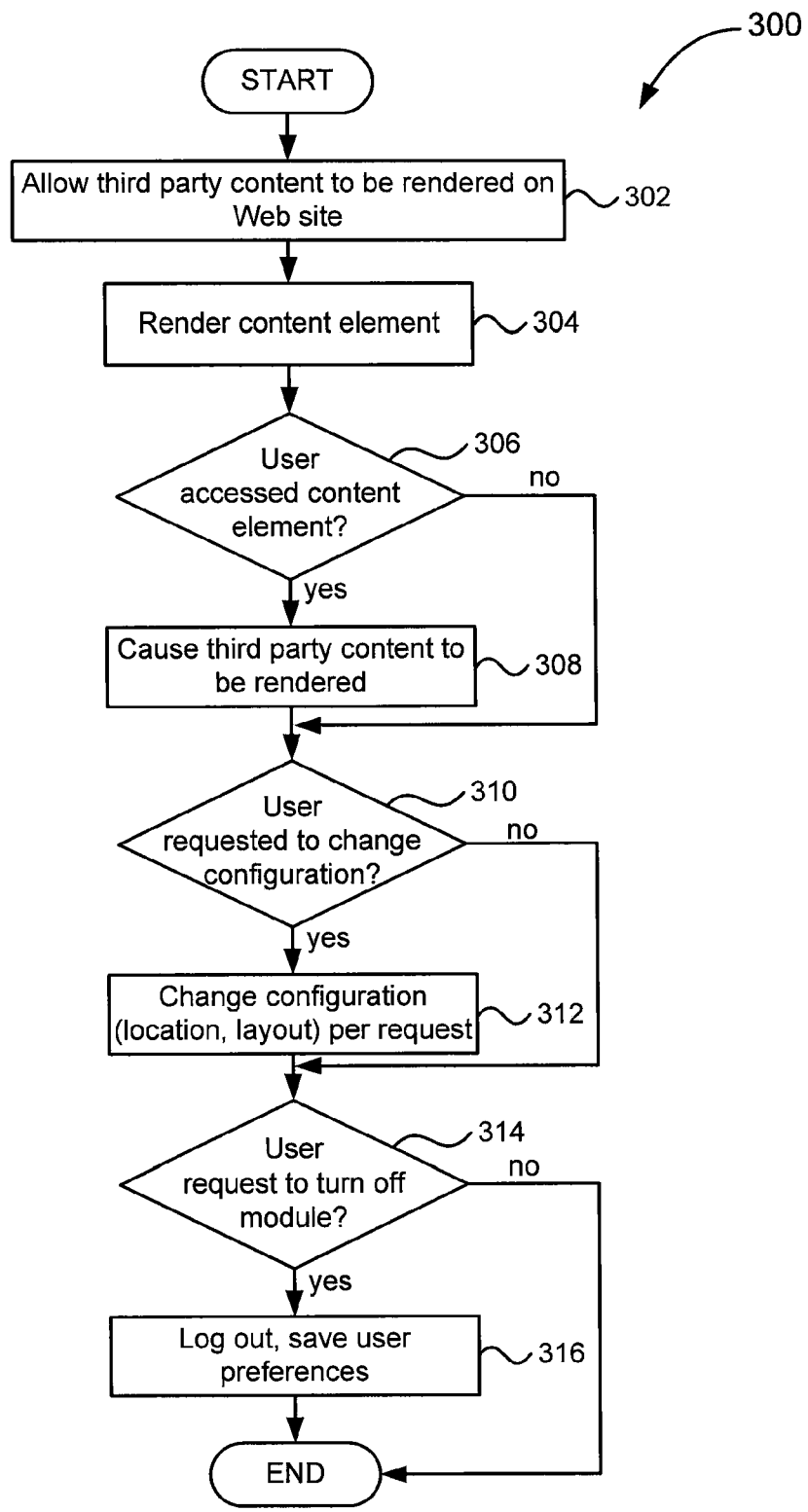
FIG. 3 illustrates a process flow diagram for rendering a third party content module on a Web site in accordance with an embodiment.

FIG. 3 is a process flow diagram illustrating a process 300 for rendering a third party content module on a Web site. At block 302, the entity operating the Web site permits the third party content to be rendered on the Web site. In one embodiment, the rendered content may be controlled by, or otherwise associated with a third party content provider. In this case, a Web site operator may enable or allow certain content modules associated with particular content providers to be displayed on the Web site such that, for example, the user may configure his/her browser based on a list of modules that the Web site operator grants permission to. In another embodiment, the Web site operator may build content modules and associate the modules with the third party content provider(s). In this embodiment, the Web site operator may allow the operator-controlled content modules to run on the Web site. In yet another embodiment, a content module may be provided by a third party content provider using a trusted script, e.g., a JavaScript library. In this case, the Web site operator may import a trusted script and run it on the Web site as a local copy or on the third party Web site providing the content. In yet another embodiment, a plug-in manager operated by the third party content provider may be used for providing a content module. The plug-in manager, operating on the Web site, may control the customization of the associated content module. The Web site operator may impose a set of the framework parameters (standards) within which the plug-in manager and the content module associated with the trusted script may operate on the Web site. For example, a particular set of parameters, e.g., metatags, may be set that declare which plug-in managers and associated content modules are supported by the Web site. The options to configure the content modules may also be supported.

At block 304, one or more content elements associated with a third party are rendered on the Web site. These elements may be rendered as requested by a user. Alternatively, a default subset of elements may be rendered. The content element may be any Web-based element representing third party content, e.g., a button, a logo, a symbol, a window, etc. At the decision block 306, it is determined whether a user accessed the content element. The user may access a content element in a number of different ways, including, but not limited to, clicking, highlighting, or otherwise marking the element. If at block 306 the determination is made that the user selected the content element, the third party content module associated with the element is rendered on the Web site at block 308. Once displayed, the user may access or select one or more elements of the content module (e.g., click, mark, etc.) in order to access third party content. The rendering of the third party content may be accomplished in a number of different ways. In one embodiment, the content may be rendered via a trusted window, e.g., an iFrame sourced to a third party server. In some embodiments, the third party content may reside on the third party server and be loaded to the Web site upon selection of the content element. In another embodiment, as described above, the content module may be operated by the Web site operator. When the user accesses the content module, a request may be sent to a server affiliated with the third party content provider, for example, a Representational State Transfer (REST) server, which facilitates rendering the content on the Web site. The position of the content module displayed upon initial rendering on the Web site may be configured by either the third party content provider or the entity rendering the Web site. By way of example only, a third party content provider may configure its content module to be initially displayed as a horizontal tool bar along the bottom of the Web site, a vertical tool bar along either the left or right side of the Web site, and so on. The entity rendering the Web site may similarly configure the content module to initially render in a particular region of the Web site.

In some embodiments, a user may reposition a content module within the Web site after the module is initially rendered. For example, a user may want to move the initially rendered content module to another region of the Web site (e.g., move the module from the bottom of the screen to the top of the screen) and/or modify the configuration of the content module (e.g., rearrange elements within the module). At decision block 310, it is determined whether the user requested to change the position and/or configuration of the rendered content module. If such request is received, at block 312, the configuration and/or position of the content module is changed/modified per user's request. The configuration of the content module may include a number of different parameters defining, for example, a location of the content module on the Web page, a shape of the module, a size of the module, and a layout of the elements within the module. Once the user finishes accessing third party content and, if needed, modifying the content module, the user may decide to turn off the content module if the module is no longer needed in the current session. At decision block 314, it is determined whether a user requested to turn off the content module. If such request has been submitted, at block 316, the specific content module is not rendered upon a subsequent visit to the Web site and the user-defined parameters of the content module (i.e. user preferences) are stored for future sessions. As described above, any Web site visited by the user in future sessions may display the user-configured content module if the Web site provider permits the third party content associated with the module. The process 300 then ends.

Figure 4:
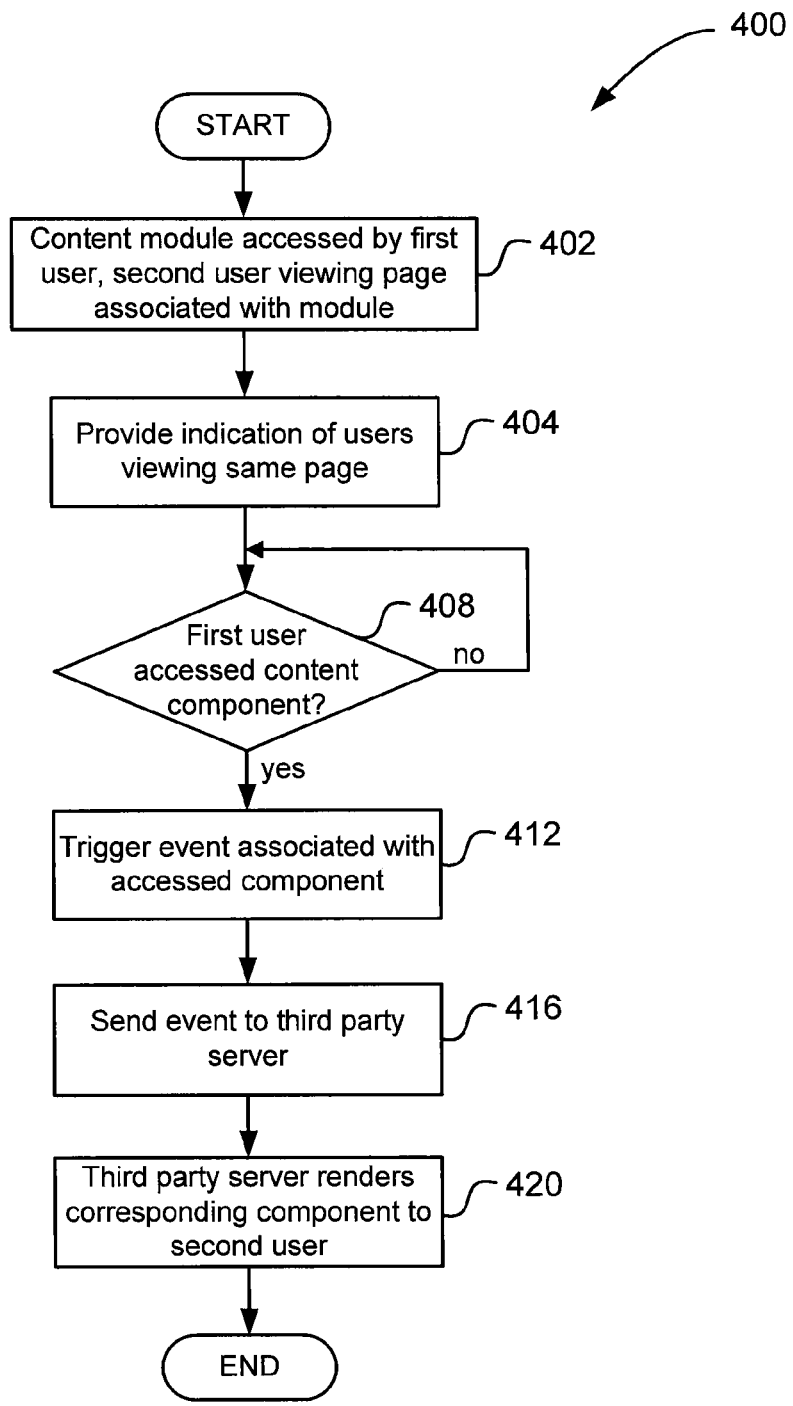
FIG. 4 illustrates a process flow diagram for allowing a user to share with other users the elements of the third party content that the user is currently viewing in accordance with an embodiment.

FIG. 4 is a process flow diagram illustrating process 400 for allowing a user to share with other users the components of the third party content that the user is currently viewing. These "other users" may be members of the user's Web community, such as, for example, user's "friends" on Facebook®, co-bloggers, and the like. At block 402, the content module is accessed by a first user in a manner described above in regard to FIG. 3. At block 404, a notification is provided that indicates that other users described above, if any, are viewing the same content at the same time. This indication may include, for example, the names, the nicknames, and/or pictures of the users. At decision block 408, it is determined whether a first user accessed a component of a content module. The user may click, highlight, select, or otherwise mark the content component by any method known in the art. A component displayed within a module may be represented by any piece of content such as, for example, a picture, a portion of text, an icon, a hyperlink, an entry made by another user, and the like. If the user did access the content component, at block 412, an event associated with the accessed content component is created. It will be appreciated that there are a number of ways of creating an event associated with a user interaction with Web content. For example, an event may be initiated through an event loop executed on the browser that flags user's interactions with the content. In other words, a trusted script executed on the Web site in connection with the content module as described above in regard to FIG. 3 may "listen" to and register user interactions with the content (e.g., clicks).

At block 416, the generated event is sent to a third party server associated with the third party content provider, which, at block 420, renders a corresponding component to a second user (e.g., a "friend" of the first user) who is viewing the same content. Registering the received event and rendering the corresponding content component may be implemented in a number of different ways; for example, through a polling loop executed on the second user's computing device. The received event may contain information about the accessed content component (e.g., identify the content component as a Document Object Model (DOM) component). The polling component may then find a corresponding content component in the DOM and mark the content component (e.g., by coloring, highlighting, selecting, or providing any other visual effect). The corresponding component is then rendered to the second user, who therefore is kept abreast of the first user's activities associated with the viewed content. The process 400 then ends. It is to be understood that the process described above may include tracking activities of not just one, but multiple users-members of the first user's Web community who happen to access the same third party content at the same time as the first user.

Figure 5:
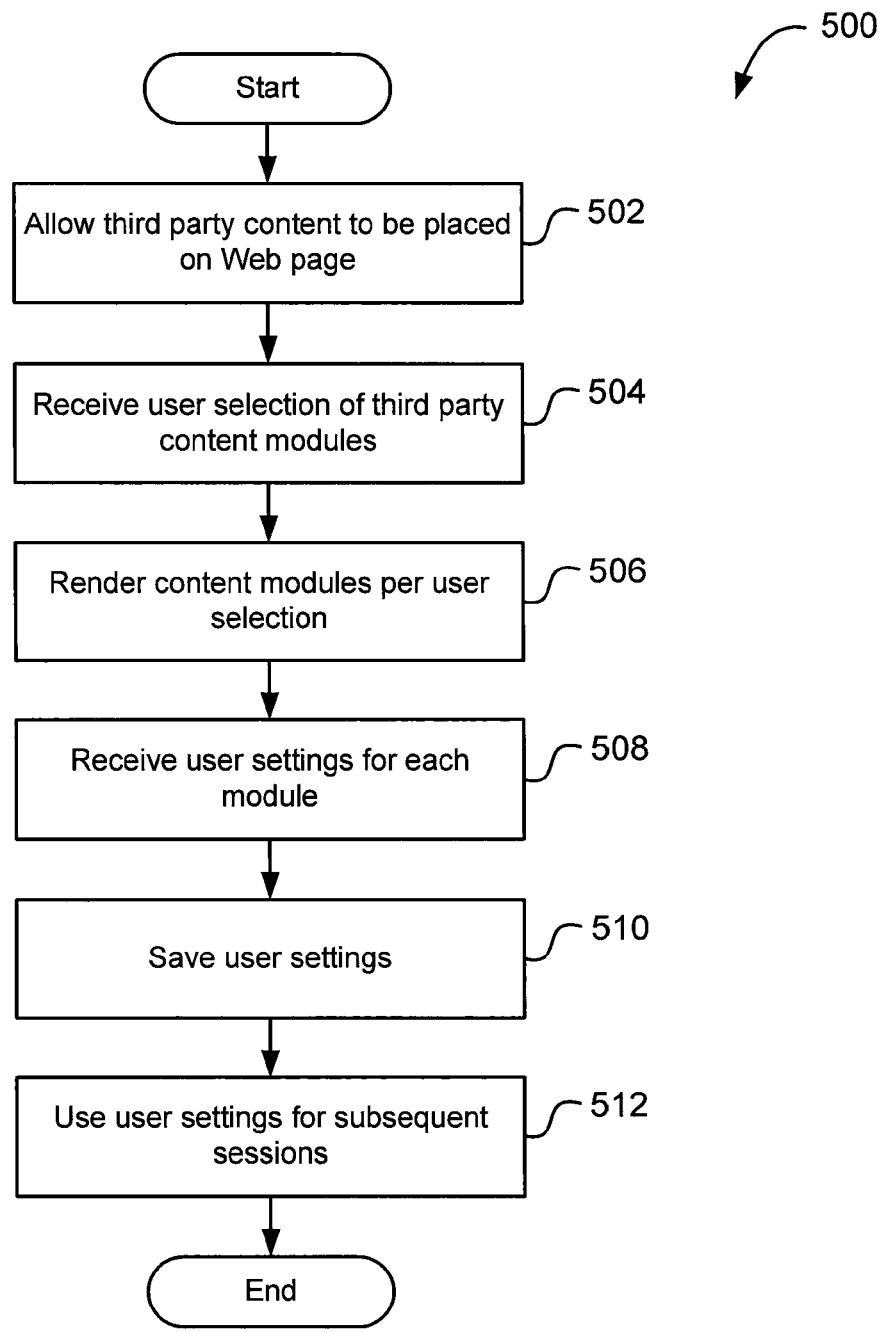
FIG. 5 illustrates a process flow diagram illustrating different aspects of the process for rendering third party content on the Web site in accordance with an embodiment.

FIG. 5 illustrates a process flow diagram describing different aspects of the process 500 for rendering third party content on the Web site. At block 502, third party content is permitted to be rendered on the Web page as described above in regard to FIG. 3. At block 504, a user selection of the content elements associated with content modules to be displayed on the Web page is received. In some embodiments, the third party content authorized for display on the Web page may be provided in a configuration setting user interface (not shown). This type of user interface would provide a user the opportunity to select which authorized third party content elements will be rendered on the Web page. In one embodiment, a "master" repository may be configured that may contain available third party content elements that a user can select. Any time a user visits a Web page, the browser may make a call to the repository to find out which third party content elements the user is interested in, which elements are authorized by the Web page, and based on a match, render the elements. At block 506, the content modules are rendered on the Web page according to the user selection. At block 508, the user settings for each content module are received by the server. At block 510, the user settings are stored. As described above, the user settings (preferences) may include a number of different parameters defining, for example, a location of the content module on the Web page, a shape of the module, a size of the module, and a layout of the module. In other words, the stored user preferences may include the customized interface that the user selected to be rendered to him/her when the user accesses any Web site in subsequent sessions. Thus, the user is provided with an ability to maintain his/her profile with regard to the third party content that the user wishes to see when accessing a Web site. In other words, the third party content modules customized per saved user preferences may be redisplayed at user's command on any Web site frequented by the user. Accordingly, at block 512, the user settings for subsequent sessions are used by the server. The process 500 then ends.

Figure 6:
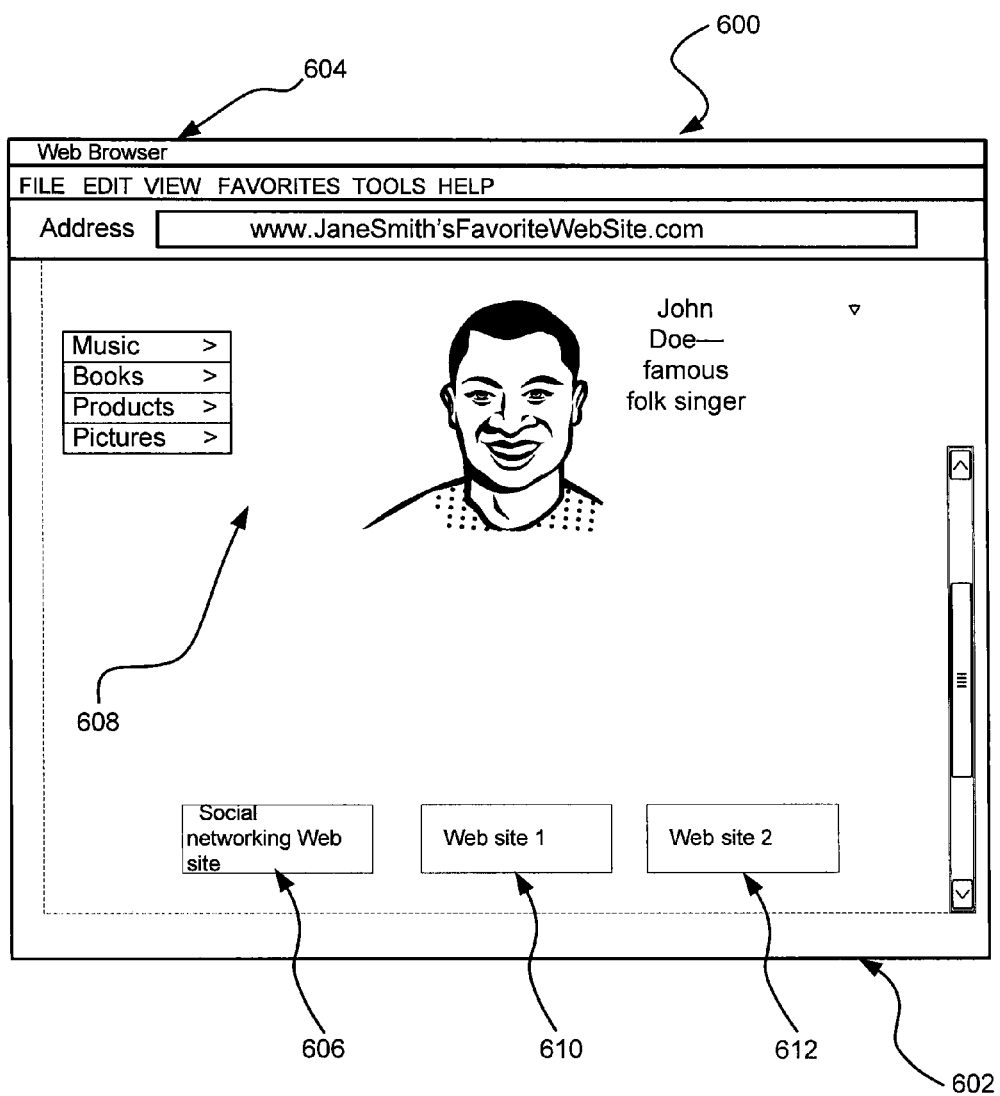
FIG. 6 illustrates an example screenshot of a Web page on which at least one third party content module may be rendered in accordance with an embodiment.

FIG. 6 illustrates an example screenshot 600 of a Web page 602 on which at least one content element may be rendered. In the example 600, the Web page 602 www.JaneSmith'sFavoriteWebSite.com is rendered on a Web browser 604. The Web page 602 may contain various types of content 608, such as, for example, a description of books, music, pictures (e.g., "John Doe-famous folk singer"), advertisements, products, links to other sites, and other content known in the art. Third party content elements 606, 610, and 612 are rendered at the bottom of the Web page in the form of a selectable button. One skilled in the art will appreciate that any type or size, configuration, layout, or shape of the content element could be used. For example, the third party content element may include a logo associated with the third party, a particular service or product provided by the third party or an application provided by the third party. Furthermore, the content elements 606, 610, and 612 may be located anywhere on the Web page 602. Using the example shown in FIG. 6, the content element 606 is rendered on the Web page because the Web page provider has authorized the content element, third party, etc. In some embodiments, the location of the content element 606 shown in FIG. 6 is set by the entity rendering the Web page. In other embodiments, the location of the content element 606 shown in FIG. 6 is the result of a user configuring the Web page to, for example, render content elements in a particular region of the Web page. When the user selects the content element 606, a third party content module is rendered on the Web page as described below in reference to FIG. 7. Similarly, the illustrative content elements 610 and 612 represent authorized third party Web sites 1 and 2 as indicated by the description provided in each content element.

Figure 7:
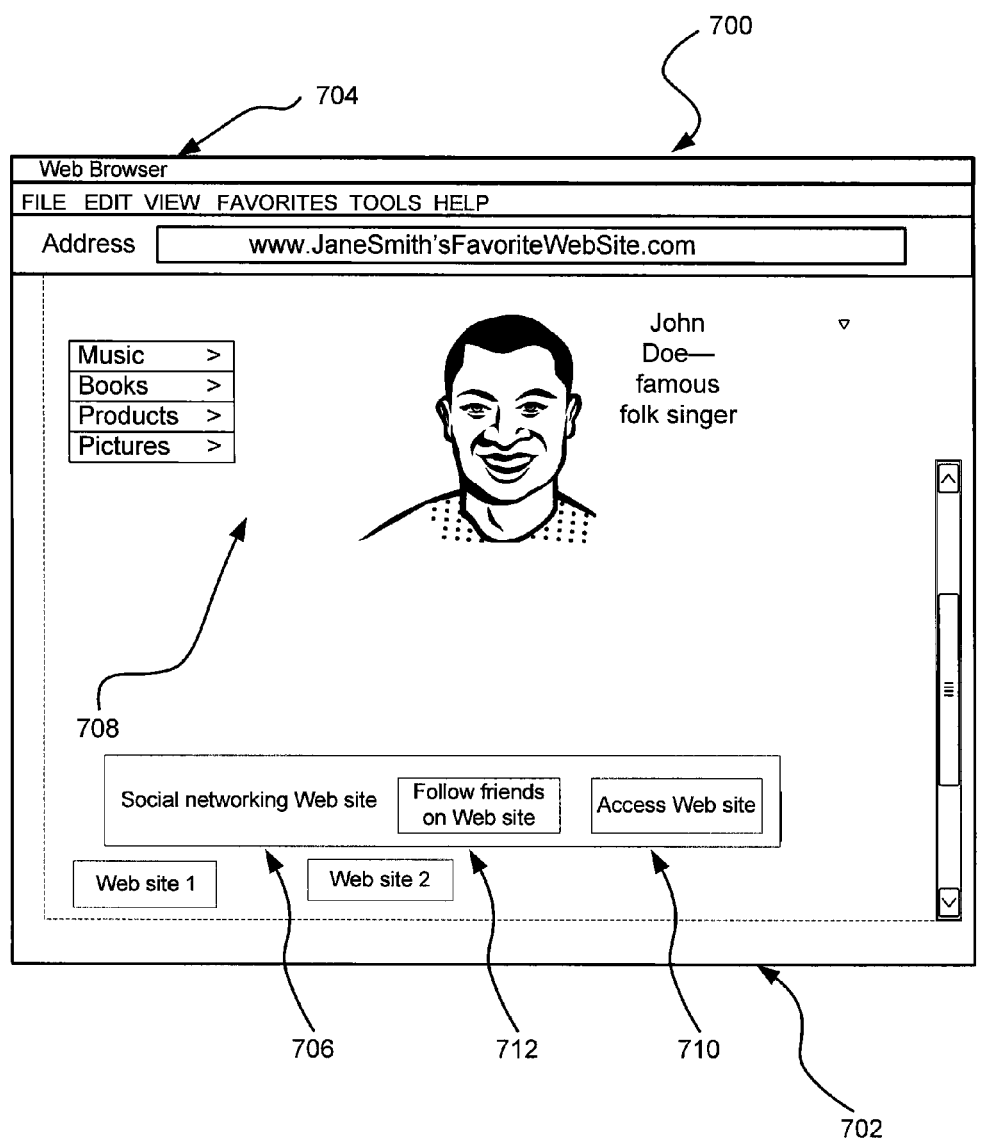
FIG. 7 illustrates another example screenshot of a Web page on which at least one third party content module may be rendered in accordance with an embodiment.

FIG. 7 illustrates an example screenshot 700 of a Web page 702 on which at least one content module 706 is rendered in response to the user's selection of content element 706 shown in FIG. 7. The Web page 702 contains content 708, Using the example shown in FIG. 7, the content module 706 is rendered on the browser 704 at the bottom of the Web page in the form of a horizontal bar. One skilled in the art will appreciate that any type or size, configuration, layout, or shape of the content module could be displayed. Furthermore, the content module 706 may be displayed anywhere on the Web page 702 according to the user (or entity rendering the Web page) preferences as described above in regard to FIG. 5. The content module 706, in this embodiment, contains a number of content elements (or components), such as, for example, a "Follow friends on Web site" button 712 and an "Access Web site" button 710. The button 710 may, for example, display the social networking Web site associated with the module 706 upon selection. The button 712 may, for example, allow the user to follow his "friends" who are currently on the same Web site, as described in greater detail in regard to FIG. 5. As described above in reference to FIG. 5, a user may change any aspect of the content module 706, such as, for example, the size, layout, location on the Web page, and the like. The user preferences with respect to the changed aspects of the content module 706 may be stored, for example, in a user profile, so as to be utilized in rendering the content module 706 when the user returns to the Web site (or accesses or any other Web site, for that matter).

Figure 8:
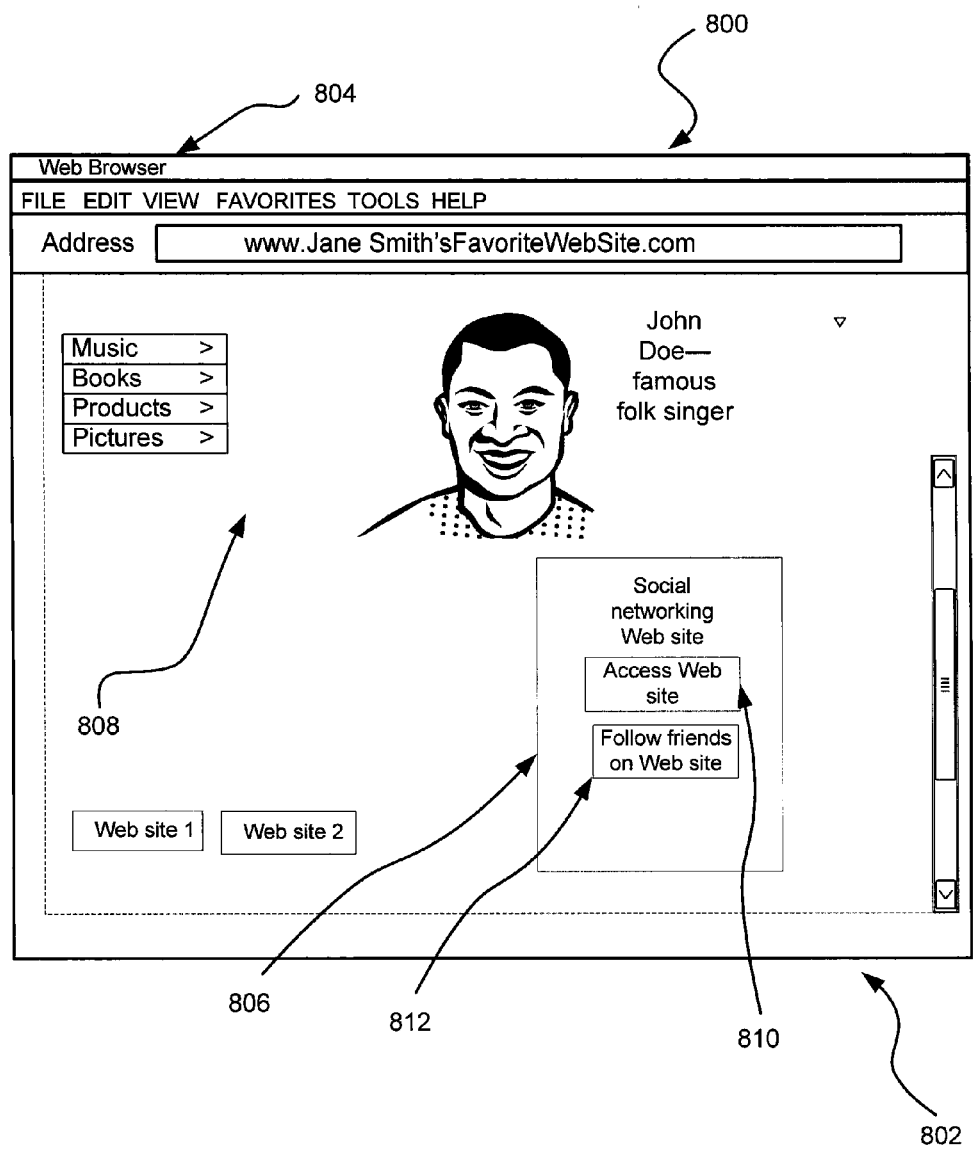
FIG. 8 illustrates still another example screenshot of a Web page on which at least one third party content module may be rendered in accordance with an embodiment.

FIG. 8 illustrates an example screenshot 800 of a Web page 802 rendered by a browser 804 on which at least one aspect of the originally rendered content module 806 has been changed by the user. Like the page shown in FIGS. 6 and 7, the Web page 802 contains content 808, Using the example Web page 800 shown in FIG. 8, the user has changed the size, layout, shape, and location of the originally rendered content module 806 to form content module 806. Specifically, as shown in FIG. 8, the user increased the size of the module 806, changed the shape of the module, moved the module to the right of the Web page 802 (from its original location shown in FIG. 7), and changed the configuration of the components within the module by moving the button 810 to a location above the button 812. As described above, all information related to all aspects of the changes made by the user may be stored and retrieved when the user returns to the Web page 802. In that case, the content module 806 will be rendered to the user according to the saved information as shown in FIG. 8. As mentioned above, any Web site that authorizes the content element associated with this content module may utilize the saved configuration information in order to render the customized content module 806 to the user.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for managing third party content displayed on a page of content, comprising:
    receiving a first request for a page of content from a client device associated with a user;
    rendering at least one user-selectable third party content element on the page of content displayed to the user;
    receiving a selection of the at least one user-selectable third party content element;
    causing a third party content module associated with the at least one user selectable third party content element to be displayed on the page in a first configuration, the third party content module providing access to third party content;
    receiving a user modification of the third party content module, the user modification including a change in displayed position of one or more components of the third party content module from a first displayed position to a second displayed position within the third party content module;
    storing, in a user profile associated with the user, information corresponding to the user modification of the at least one third party content module resulting in a second configuration different from the first configuration, the information including the second displayed position within the third party content module;
    receiving a second request for the page of content from the client device, the second request received subsequent to the first request; and
    causing the third party content module to be displayed by the client device utilizing the information corresponding to the second configuration stored in the user profile by rendering the one or more components of the third party content module in the second position within the third party content module.

2. The computer-implemented method of claim 1, further comprising: prior to rendering at least one user-selectable third party content element on a page displayed to a user, allowing third party content to be displayed on the page.

3. A computer-implemented method for managing third party content, comprising:
    storing information for each of a plurality of third party content elements that were selected by a user for display on at least one page of content;
    receiving, from a client device, a first request for a page associated with at least one of the plurality of third party content elements specified in the stored information;
    rendering for display on the page in a first configuration at least one third party content module associated with the at least one of the plurality of third party content elements;
    receiving a user modification of the third party content module, the user modification including a change in displayed position of one or more components of the third party content module from a first displayed position to a second displayed position within the third party content module;
    storing information corresponding to the user modification of the at least one third party content module resulting in a second configuration different from the first configuration, the information including the second displayed position within the third party content module;
    receiving, from the client device, a second request for the page, the second request received subsequent to the first request; and
    causing the third party content module to be displayed by the client device utilizing the information corresponding to the second configuration stored in the user profile by rendering the one or more components of the third party content module in the second position within the third party content module.

4. The computer-implemented method of claim 3, wherein the user submits a request to access the page associated with at least one of the plurality of third party content elements specified in the stored information by accessing the at least one of the plurality of third party content elements.

5. The computer-implemented method of claim 3, wherein the information corresponding to a user modification includes user-defined parameters associated with the at least one third party content module, the user-defined parameters associated with the at least one third party content module including one of dimensions, shape, content, location, or layout of the module.

6. The computer-implemented method of claim 3, further comprising: in response to a user request to disable at least one third party content module rendered for display on the at least one page of content, disabling the third party content module.

7. The computer-implemented method of claim 3, wherein the modified third party content module in the second configuration is rendered for display when the user accesses a page of content.

8. The computer-implemented method of claim 3, wherein the at least one third party content module is rendered via an iFrame embedded in the page and sourced to a third party content provider.

9. The computer-implemented method of claim 3, wherein the at least one third party content module is rendered via a trusted script imported from a third party content provider.

10. A computer system for managing third party content, comprising a processor and a memory having executable instructions that, when executed on the processor, cause the processor to:
store information for each of a plurality of third party content elements that were selected by a user for display with at least one page of content;
receive, from a client device, a first request for a page associated with at least one of the plurality of third party content elements specified in the stored information;
render for display on the page in a first configuration at least one third party content module associated with the at least one of the plurality of selectable third party content elements;
receive a user modification of the third party content module, the user modification including a change in displayed position of one or more components of the third party content module from a first displayed position to a second displayed position within the third party content module;
store information corresponding to the user modification of the at least one third party content module resulting in a second configuration different from the first configuration, the information including the second displayed position within the third party content module;
receive, from the client device, a second request for the page, the second request received subsequent to the first request; and
cause the third party content module to be displayed by the client device utilizing the information corresponding to the second configuration stored in the user profile by rendering the one or more components of the third party content module in the second position within the third party content module.

11. The computer system of claim 10, wherein the executable instructions further cause the processor to detect a user request submitted by accessing the at least one of the plurality of third party content elements.

12. The computer system of claim 10, wherein the information corresponding to the user modification includes user-defined parameters associated with the at least one third party content module.

13. The computer system of claim 12, wherein the user-defined parameters associated with the at least one third party content module include one of dimensions, shape, content, and layout of the module.

14. The computer system of claim 10, wherein the modified third party content module is rendered for display when the user accesses a page of content.

15. A computer-readable storage medium having computer-executable instructions stored thereon that, when executed by a computer, cause the computer to:
store information for each of a plurality of third party content elements that were selected by a user for display with at least one page of content;
receive, from a client device, a first request for a page associated with at least one of the plurality of third party content elements specified in the stored information;
render for display on the page in a first configuration at least one third party content module associated with the at least one of the plurality of the third party content elements;
receive a user modification of the third party content module, the user modification including a change in displayed position of one or more components of the third party content module from a first displayed position to a second displayed position within the third party content module;
store information corresponding to a user modification of the at least one third party content module resulting in a second configuration different from the first configuration, the information including the second displayed position within the third party content module;
receiving, from the client device, a second request for the page, the second request received subsequent to the first request; and
render the modified third party content module in the second configuration for display by rendering the one or more components of the third party content module in the second position within the third party content module.

16. The computer-readable storage medium of claim 15, wherein the computer-executable instructions stored thereon, when executed by a computer, further cause the computer to detect a user request submitted by accessing the at least one of the plurality of third party content elements.

17. The computer-readable storage medium of claim 15, wherein the information corresponding to the user modification of the at least one third party content module includes user-defined parameters associated with the at least one third party content module.

18. The computer-readable storage medium of claim 15, wherein the computer-executable instructions that cause the computer to render for display on the page at least one third party content module associated with the at least one of the plurality of the third party content elements, further cause the computer to render the at least one third party content module via an iFrame embedded in the page and sourced to a third party content provider.

19. The computer-readable storage medium of claim 15, wherein the computer-executable instructions that cause the computer to render for display on the page at least one third party content module associated with the at least one of the plurality of the third party content elements, further cause the computer to render the at least one third party content module via a trusted script imported from a third party content provider.

20. The computer-readable storage medium of claim 15, wherein the computer-executable instructions stored thereon, when executed by a computer, cause the computer to render the modified third party content module for display when the user accesses a page of content.

* * * * *